United States Patent Office

2,702,315
Patented Feb. 15, 1955

2,702,315

SOUND RECORD TRANSFER METHOD AND SYSTEM

Robert W. Roderick, North Hollywood, Calif., assignor to Radio Corporation of America, a corporation of Delaware Application May 1, 1951, Serial No. 224,020

11 Claims. (Cl. 179—100.1)

This invention relates to sound recording equipment, and particularly to an automatic sound record transfer system whereby certain portions or sound sequences on a continuous sound record roll may be transferred to other sound record rolls either photographic or magnetic, or both.

As is well-known in the art of sound recording for motion picture production, a series of sequences are photographed and recorded on separate films. Thus, the photographic film will have a series of sequences, some of which may be substantial duplicates of the same scene, the roll of sound film also containing corresponding sound sequences, which may be substantial duplicates. A sequence is a picture or sound section of a roll of film which has been photographed or recorded during the continuous advancement of the films. In both series of picture and sound sequences, some may be satisfactory and others unsatisfactory. The satisfactory sequences are generally called "OK" takes, and the unsatisfactory sequences are generally called "NG" takes.

The next step is the separation of the OK takes from the NG takes, the OK takes being usually rerecorded to a single roll of film, while the NG takes may or may not be rerecorded to a second film. The present invention is one wherein the original sound track sequences may be recorded either photographically or magnetically, preferably the latter, and then the OK takes are automatically rerecorded as a photographic sound track and the NG takes are rerecorded magnetically. Of course, both OK and NG takes may be recorded either photographically or magnetically. If the NG takes are rerecorded, they will be held in storage in case of damage to a correspondingly satisfactory take, since it may be more expeditious to use the NG sequence than reconstruct and reshoot the entire scene.

The invention also provides synchronization marks on the photographic picture film and on the magnetic film, which may be used to subsequently combine the tracks into a composite photographic print.

The principal object of the invention, therefore, is to facilitate the recording and editing of motion picture sound records or tracks.

Another object of the invention is to provide an improved sound recording and editing system.

A further object of the invention is to provide an improved system for recording synchronization marks on photographic picture film and magnetic sound film.

A still further object of the invention is to provide an improved system for automatically transferring satisfactory sequences of a plurality of sequences to one type of sound record, such as photographic, and the unsatisfactory sequences to another sound record, such as magnetic.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 3 is a partial view of an original magnetic sound record used in the invention.

Figure 1:
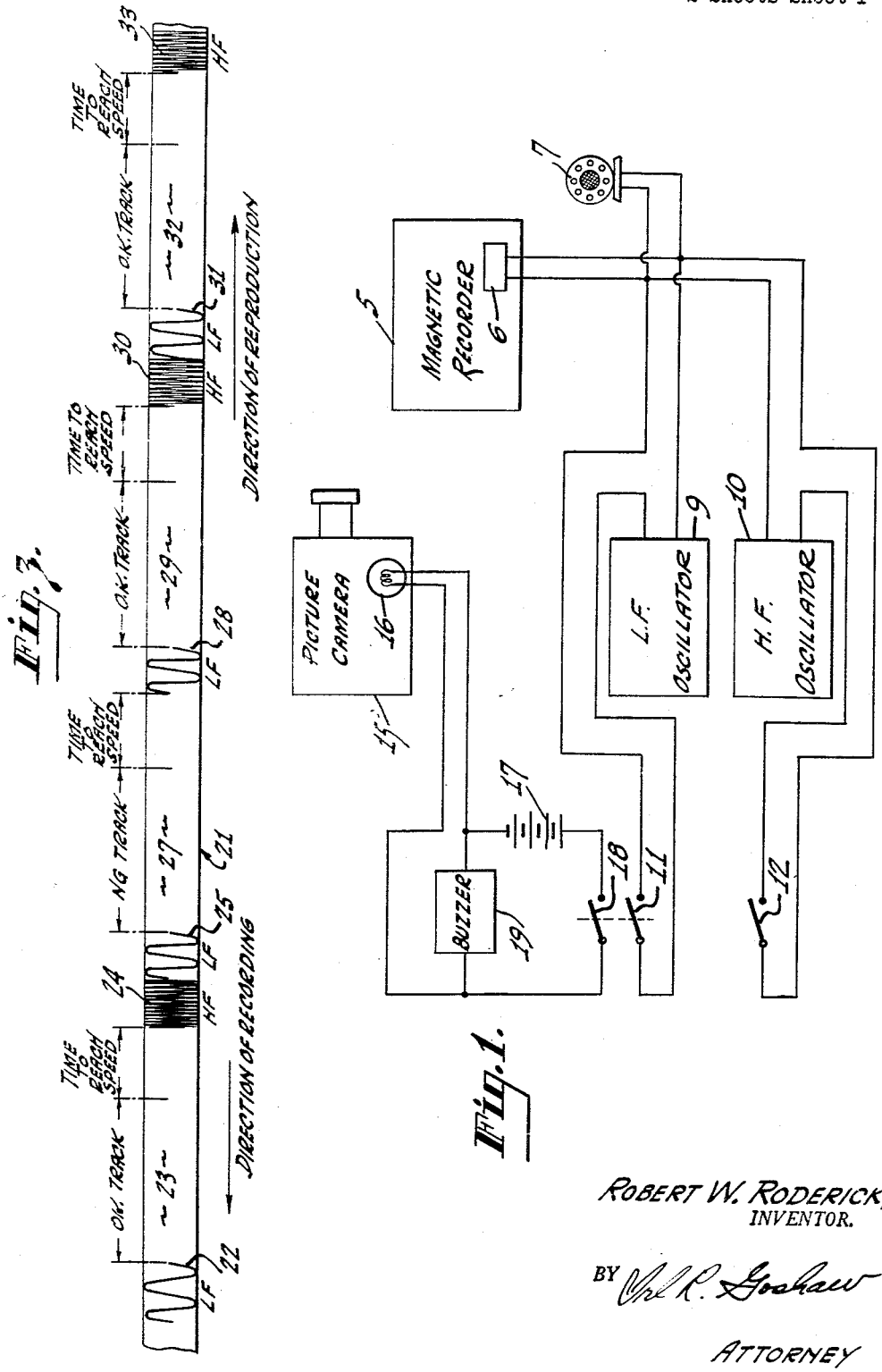
Fig. 1 is a block diagram illustrating the method of and system for applying synchronization or control signals to the films together with the sound signals.

Referring now to the drawings, the original recording system utilizes a magnetic recorder 5 having a recording head 6 therein. The recorder 5 could also be a photographic recorder. The head or modulator is supplied from a microphone 7. Also connectable with the head 6 is a low frequency oscillator 9 and a high frequency oscillator 10. The low frequency oscillator impresses a frequency below the audio spectrum when a switch 11 is closed, and the high frequency oscillator will impress a frequency above the audio spectrum when a switch 12 is closed. These frequencies are not critical, the low frequency being between thirty and sixty cycles, and the high frequency being between fifteen and twenty kilocycles, for example.

In Fig. 1, there is also shown a picture camera 15 with a blooping light lamp 16. This lamp is energized from a battery 17 when a switch 18 is closed. The energization of the lamp 16 simultaneously energizes a buzzer 19, which will audibly indicate that the lamp 16 has been energized, and also, that the system is up to speed. It will be noted that switches 11 and 18 are mechanically interconnected, and thus, are closed and opened simultaneously. Thus, when the blooping lamp 16 is energized to fog the picture film, the magnetic head 6 will be energized with a low frequency signal to provide synchronization marks on the picture and sound films, respectively.

Referring now to Fig. 3, the invisible magnetic control signals have been illustrated on the strip of magnetic sound film 21 for purposes of explanation. During recording, the film is run from right to left, as indicated by the arrow, and when the film is up to speed and switch 11—18 closed, a low frequency signal 22 will be impressed on the film. A satisfactory recording may then be made between the arrows, as indicated at 23. The recorder and camera may then be stopped, and if this take is satisfactory, the switch 12 will be closed when the film is again up to speed and a high frequency signal 24 will be impressed on the sound film. Immediately following impression of signal 24, another low frequency signal 25 may be recorded by the closing of switch 11—18, which simultaneously places a fog on the picture film, thus providing synchronization marks.

The next sound sequence between the arrows may be an NG take, as indicated at 27. The equipment is again stopped, and when brought up to speed again, the high frequency signal will not be impressed, but only a low frequency synchronization mark 28. The next sound sequence may be an OK take, such as indicated at 29, and this take will be provided with a high frequency mark 30. The synchronization mark 31 is again applied, following which may be an OK take 32. This take is then marked with the high frequency signal 33. Thus, the complete roll of original film will be marked in the manner as shown in Fig. 3, depending upon the nature of the takes, except that all signals will be invisible. If the film is photographic, the signals will be recorded by modulated light and the film processed.

Figure 2:
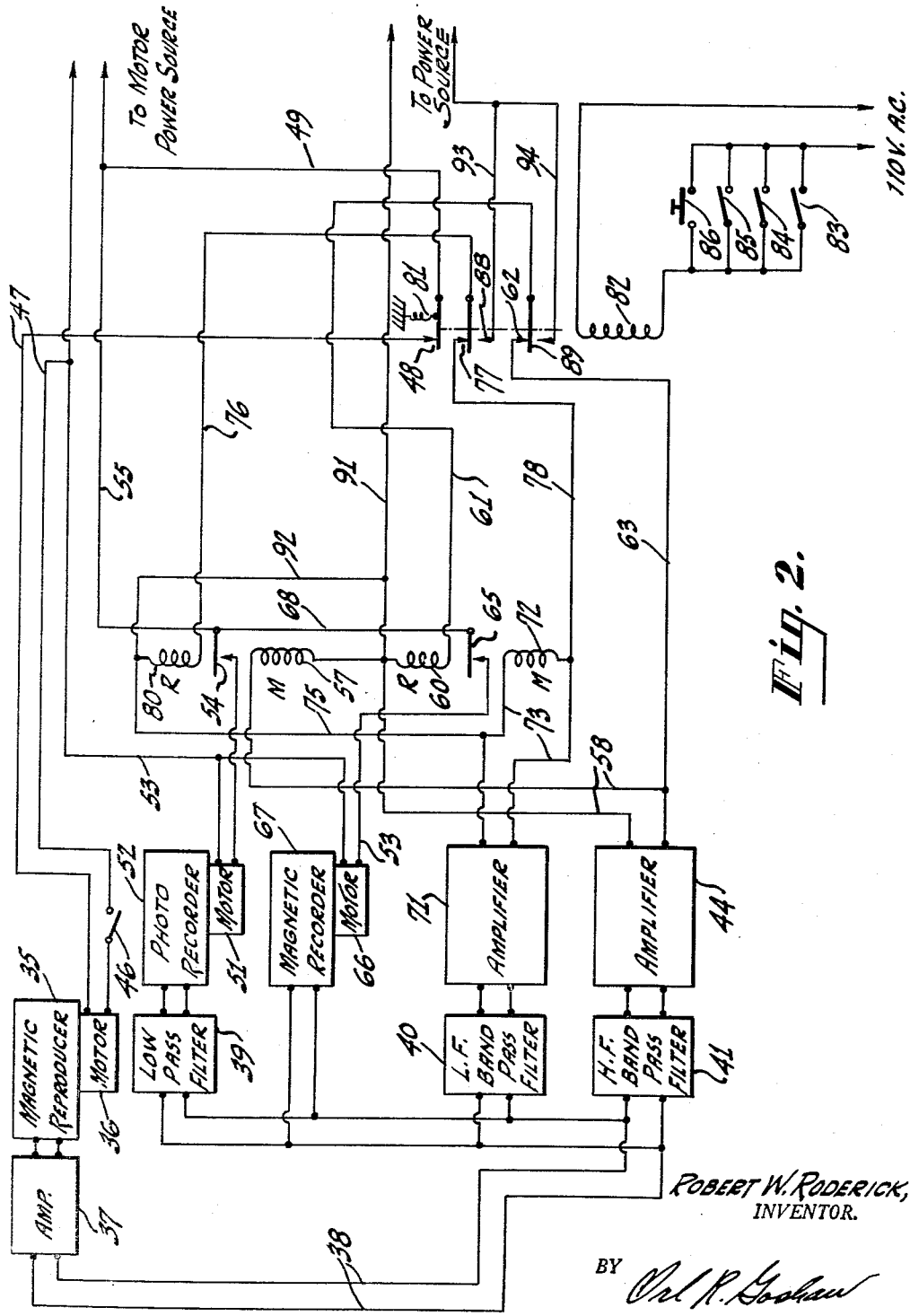
Fig. 2 is a block diagram of the automatic rerecording system for separating and rerecording the satisfactory and unsatisfactory sequences.

The next step is to segregate the OK takes and rerecord them to a photographic record for editing purposes, while the NG takes are rerecorded to a magnetic film for future reference, if desired. The system for accomplishing this rerecording is shown in Fig. 2. The film of Fig. 3 is placed in a magnetic reproducer 35 having a driving motor 36. When a switch 46 is closed, the motor 36 will be energized from a motor power source over conductors 47, closed switch contacts 48, and conductor 49. The reproduced signal is amplified in an amplifier 37 and then transmitted over conductors 38 to a low-pass filter 39 connected to a photographic recorder 52, a low frequency band-pass filter 40 connected to an amplifier 71, a high frequency band-pass filter 41 connected to an amplifier 44, and to a magnetic recorder 67. For rerecording, the direction of the film through the reproducer is reversed, as indicated by the arrow in Fig. 3. Thus, the first signal reproduced will be the high frequency signal 33. This signal will pass through the high frequency band-pass filter 41 and will be amplified in the amplifier 44.

The power source for motor 36 is connected to a motor 51 of the photographic sound recorder 52, over conductor 53, contacts 54, when closed, and conductor 55. The output of amplifier 44 will close contacts 54 by energizing their make coil 57 over conductors 58. Simultaneously, a release coil 60 will be energized over one of conductors 58, conductor 61, closed contacts 62, and conductor 63. This energization of coil 60 insures the opening of contacts 65, which control the power to a motor 66 of the magnetic recorder 67 over conductors 53, contacts 65, and conductor 68.

Thus, the output of amplifier 44 caused by high frequency signal 33, closes contacts 54 and starts the photographic recorder 52. Thus, the satisfactory take 32 is recorded photographically by the recorder 52, since the signal will pass through the low-pass filter 39. Also, the low frequency signal 31 will pass through low frequency band-pass filter 40 and also through filter 39 to the photographic recorder to record a photographic synchronization mark. Furthermore, the low frequency signal 31 will pass filter 40 and be amplified in amplifier 71, the output of which is impressed on the make coil 72 over conductors 73 to close contacts 65. This will energize motor 66 and start the magnetic recorder 67. Simultaneously, over a conductor 75, a conductor 76, closed contact 77, and conductor 78, the release coil 80 will be energized, breaking contacts 54 and de-energizing motor 51 of the photographic recorder 52. However, if the high frequency signal 30 immediately follows the low frequency signal 31, this signal impulse will immediately close contacts 54, re-energizing motor 51, and will open contacts 65 to de-energize motor 66. OK take 29 will thus be recorded by the photographic recorder 52.

At the end of the recording of take 29, the low frequency signal 28 will stop the photographic recorder 52 and start the magnetic recorder 67, as explained above. However, since the signal 28 is not immediately followed by a high frequency signal, the NG take 27 will be recorded by the magnetic recorder, which will continue to record until the high frequency signal 24 again starts the photographic recorder 52 and stops the magnetic recorder 67, which will then permit the photographic recording of the next OK take 23. At the end of this take, the low frequency synchronization mark will be applied and the reproducer and all recorders stopped, as will now be explained.

The contacts 43, 77, and 62, controlling the power to the three motors, are normally held closed by a spring 81, and are broken only when coil 82 is energized by the closing of any one of switches 83, 84, 85, or 86. When the contacts 77 and 62 are broken, contacts 88 and 89 are made, which will apply power over conductors 91, 92, 76, 93, 61, and 94 to both of the release windings 60 and 80 to insure the stopping of both recorders. Switch 83 may be a film-operated switch in the magnetic reproducer; switch 84, a film-operated switch in the photographic recorder 52; and switch 85, a film-operated switch in the magnetic recorder 67. These switches are closed when the film runs out in either the reproducer or recorders, thus energizing winding 82 and disconnecting the power from the motors of the reproducer and recorders. If it is desired to stop the equipment manually, switch 86 will be momentarily closed.

The above system, therefore, will operate automatically after being started, and will transfer the OK takes to a photographic recorder and the NG takes to a magnetic recorder, it being understood that both recorders may be magnetic, or both recorders may be photographic, or they may be in reverse order to that shown in Fig. 2.

I claim:

1. A system for segregating sound sequences from one film roll having different types of sound signals and a plurality of control signals recorded thereon to a plurality of film rolls, comprising a sound film reproducer, a plurality of sound film recorders, means for fixedly connecting the output of said reproducer to the inputs of said recorders, individual driving means for each of said recorders and said reproducer, a power supply for all of said driving means, a plurality of control current operated switches for selectively connecting said power supply to individual driving means at mutually exclusive intervals, and a plurality of signal current selective means for controlling the operation of said switches for starting and stopping said recorders in accordance with the particular type of signal reproduced by said reproducer.

2. A system in accordance with claim 1, in which said control signals vary in frequency and said last mentioned means are filters on which all of said control signals are impressed, one of said filters selecting a signal of a particular frequency for operating a particular switch.

3. A system in accordance with claim 1, in which an individual switch is provided between said reproducer and between each of said recorders and said power supply, said switch including a relay having contacts between the power supply and the driving means of said recorders and said reproducer, actuation of said relay opening said contacts to de-energize said recorder and reproducer driving means.

4. A system in accordance with claim 3, in which a plurality of actuating switches for said relay are provided, one of said switches being at each of said recorders and at said reproducer for energizing said relay, energization thereof breaking said contacts and de-energizing all of said driving means.

5. A system for continuously transferring a plurality of serially arranged sound sequences of different types on a single film to one film having all of one type of sequences in a continuous order thereon and another film having all of another type of sequences in a continuous order thereon, comprising means for reproducing in serial order all of said sequences on said single film, means for continuously impressing said reproduced sound sequences on a plurality of sound recorders simultaneously, means for power energizing only one certain recorder to record all of one certain type of sequences when said certain type is reproduced, and means for power energizing only other certain recorder when said another certain type of sequences is reproduced.

6. A system in accordance with claim 5, in which said first power energized recorder is de-energized when said second recorder is energized, and said second recorder is de-energized when said first recorder is energized.

7. A system for continuously transferring a plurality of serially arranged sound sequencies of different types on a single film to one film having all of one type of sequences in a continuous order thereon and another film having all of another type of sequences in a continuous order thereon, comprising means for reproducing said sequences on said single film in the reverse order of their recording, continuously impressing said reproduced sound sequences on a plurality of sound recorders simultaneously, means for recording all of one certain type of said sequences on one film in a continuous order, the recording being accomplished by power energizing one recorder of said certain type of sequences only during the reproduction thereof, means for recording all of another certain type of said sequences on another film in a continuous order, the recording being accomplished by power energizing another recorder of said other type of sequences only during the reproduction thereof, means for de-energizing said first recorder, and means for controlling the energizing and de-energizing of said recorders by multiplicity of signals on said single film.

8. A system for continuously transferring a plurality of serially arranged sound sequences of different types on a single film and control signals, certain of which are to be transferred for synchronizing purposes, to one film having all of one type of sequences recorded in a continuous order thereon and another film having all of another type of sequences recorded in a continuous order thereon, comprising means for reproducing said plurality of sequencies and control signals in reverse order of their recording, a plurality of film recorders, means for continuously impressing said reproduced sequences and control signals upon all of said recorders simultaneously, separate driving means for each of said recorders, and means actuated by a plurality of different reproduced signals recorded on said signal film for starting one recorder and stopping another recorder by energizing and de-energizing respective driving means in accordance with the character of said control signals.

9. The system in accordance with claim 8, in which said last mentioned means includes switches controlling the energy to said driving means and a plurality of frequency selectors for actuating said switches.

10. The system in accordance with claim 8, in which said control signals are characterized by different frequencies and filters are provided for selecting the frequency for starting a particular record, a filter being provided to permit the recording of said synchronizing signals.

11. A system for continuously transferring a plurality of serially arranged sound sequences of different types on a single film to one film having all of one type of sequences recorded in a continuous order thereon and another film having all of another type of sequences recorded in a continuous order thereon, comprising means for reproducing said plurality of sequences in reverse order of their recording, a plurality of film recorders, means for continuously impressing said reproduced sequences upon all of said recorders simultaneously, separate driving means for each of said recorders, and means actuated by a plurality of different reproduced signals recorded on said single film for starting one recorder and stopping another recorder by energizing and de-energizing respective driving means in accordance with the character of said signals, are provided a switch at said reproducing means, a switch at each of said film recorders, and relay operated contacts for said driving means, operation of any one of said switches de-energizing all of said driving means.

References Cited in the file of this patent

UNITED STATES PATENTS

| | | |
|---|---|---|
| 2,076,937 | Cannon | Apr. 13, 1937 |
| 2,230,949 | Heller et al. | Feb. 4, 1941 |
| 2,402,095 | Slyfield | June 11, 1946 |
| 2,446,479 | Begun | Aug. 3, 1948 |
| 2,466,186 | Thompson | Apr. 5, 1949 |
| 2,499,587 | Kellogg | Mar. 7, 1950 |
| 2,499,603 | Mueller | Mar. 7, 1950 |
| 2,558,853 | Kappeler | July 3, 1951 |